US008493264B2

(12) United States Patent
Sasakawa

(10) Patent No.: US 8,493,264 B2
(45) Date of Patent: Jul. 23, 2013

(54) TERRESTRIAL OBJECT INFORMATION JUDGING IMAGE PRODUCING METHOD AND PROGRAM

(75) Inventor: Tadashi Sasakawa, Tokyo (JP)

(73) Assignee: Pasco Corporation, Tokyo (JP)

( * ) Notice: Subject to any disclaimer, the term of this patent is extended or adjusted under 35 U.S.C. 154(b) by 490 days.

(21) Appl. No.: 12/673,713

(22) PCT Filed: Aug. 14, 2008

(86) PCT No.: PCT/JP2008/064587
§ 371 (c)(1),
(2), (4) Date: Feb. 16, 2010

(87) PCT Pub. No.: WO2009/025234
PCT Pub. Date: Feb. 26, 2009

(65) Prior Publication Data
US 2011/0043402 A1 Feb. 24, 2011

(30) Foreign Application Priority Data
Aug. 17, 2007 (JP) ................. 2007-213160

(51) Int. Cl.
*G01S 13/89* (2006.01)
*G01S 13/90* (2006.01)
*G01S 13/00* (2006.01)

(52) U.S. Cl.
USPC ........ 342/179; 342/25 R; 342/25 A; 342/175; 342/176; 342/190; 342/191; 342/195

(58) Field of Classification Search
USPC ...... 342/25 R–25 F, 175, 176, 179, 192–197, 342/52–55, 59, 61–66, 190, 191; 382/100, 382/103, 108
See application file for complete search history.

(56) References Cited

U.S. PATENT DOCUMENTS 7,298,922 B1 * 11/2007 Lindgren et al. ............ 342/25 A
2009/0102705 A1 * 4/2009 Obermeyer ................. 342/25 F

FOREIGN PATENT DOCUMENTS

JP 7 303647 11/1995
JP 2004 21427 1/2004

OTHER PUBLICATIONS

"Gosei Kaiko Radar ni yoru Remote Sensing no Shohinka ni Mukete no Feasibility Study", The Mechanical Social Systems Foundation, pp. 4.2-14 to 4.2-16, Jun. 25, 2007, (with English translation).
Myungjin, Choi et al., "Fusion of Multispectral and Panchromatic Satellite Images: Multiresolution Analysis-Based Approach", IEICE Technical Report, pp. 71-74, SANE2004-115, Feb. 25, 2005.
Youcef, Chibani "Multisource Image Fusion by Using the Redundant Wavelet Decomposition", IEEE, vol. 2, pp. 1383-1385, Jul. 21, 2003.

(Continued)

*Primary Examiner* — Bernarr Gregory
(74) *Attorney, Agent, or Firm* — Oblon, Spivak, McClelland, Maier & Neustadt, L.L.P.

(57) ABSTRACT

In the case where radar image data obtained from a radar device equipped in a flying body and optical image data of a district taken by the radar device are synthesized to produce a terrestrial object information judging image, the radar image data are approximated to a black and white panchromatic image character. The radar image data approximated to the black and white panchromatic character and the optical image data are aligned in position and then synthesized. As a suitable embodiment, in an approximation processing of the radar image data to the black and white panchromatic image character, histogram conversion processing is carried out in accordance with a histogram characteristic of the radar image data.

16 Claims, 6 Drawing Sheets

OTHER PUBLICATIONS

Olaf, Hellwich et al., Landuse Classification by Fusion of Optical and Multitemporal SAR Imagery, Geoscience and Remote Sensing Symposium 2000. Proceedings, IGARSS 2000, IEEE, vol. 6, pp. 2435-2437, (2000).

Youcef, Chibani "Selective Synthetic Aperture Radar and Panchromatic Image Fusion by using the a Trous Wavelet Decomposition", IEEE, Eurasip Journal on Applied Signal Processing 2005, vol. 14, pp. 2207-2214, (2005).

Research Report on Commercialization of Remote Sensing with Synthetic Aperture Rader, Summary, System Technology Development Research 17-R-6, p. 11, 12, Mar. 2006, (with English translation).

* cited by examiner (a) SAR IMAGE (b) OPTICAL IMAGE (a) BEFORE CONVERSION (b) AFTER CONVERSION

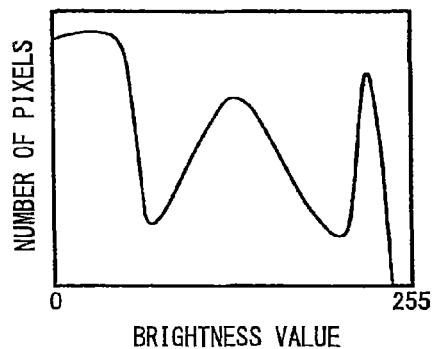
Fig. 2A SAR IMAGE
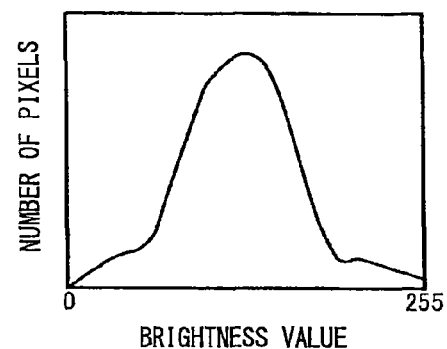
Fig. 2B OPTICAL IMAGE
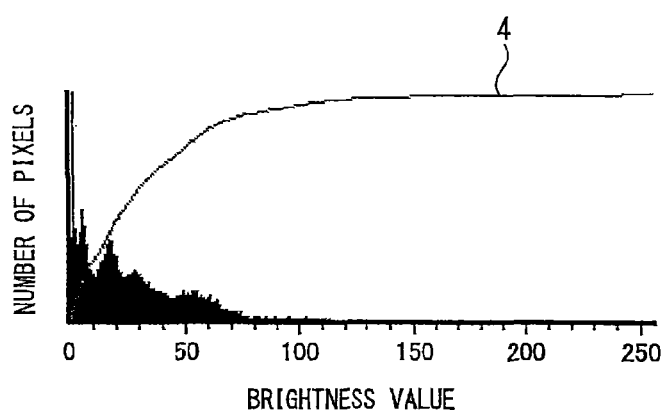
Fig. 3A
BEFORE CONVERSION
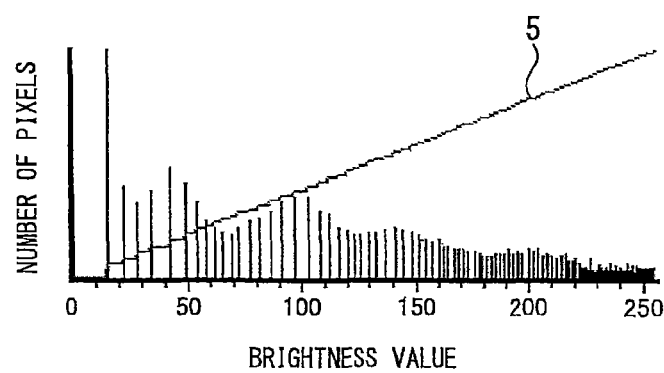
Fig. 3B
AFTER CONVERSION

TERRESTRIAL OBJECT INFORMATION JUDGING IMAGE PRODUCING METHOD AND PROGRAM

TECHNICAL FIELD

The present invention relates to a terrestrial object information judging (interpreting) image producing method for producing a terrestrial object information interpreting image using radar image data and a computer program for executing the method, wherein the radar image data is acquired by a radar device mounted on a flying body such as an artificial satellite and adapted to extensively photograph the ground surface of a photographic subject area to obtain information about the condition of the ground surface.

BACKGROUND ART

There is conventionally known a Synthetic Aperture Radar (SAR) as an active sensor for measuring a reflected wave of an electromagnetic wave (a microwave pulse) radiated to the ground surface. By use of the characteristic of the microwave, the Synthetic Aperture Radar can extensively photograph the ground surface, day and night, regardless of weather conditions. Further, some of the latest satellite-borne Synthetic Aperture Radar can photograph images with a resolution of 1 m. However, due to the influence of noise, complicated mechanism of scattering and the like, it is difficult to interpret terrestrial objects from a radar image (referred to as a "SAR image" hereinafter) photographed from a platform such as an artificial satellite, an aircraft or the like.

On the other hand, since an optical image is taken at visible wavelengths, it is possible to obtain the same information as viewed by the naked human eye from the optical image, and therefore the optical image has the advantages that the terrestrial objects can be easily interpreted. However, the problem with the optical image is that it can be taken only in good weather.

Currently, attempts are being made to precisely grasp terrestrial object information by using a data fusion technique in which the SAR image and the optical image are combined with each other (refer to, for example, "Research Report on Commercialization of Remote Sensing with Synthetic Aperture Radar (Summary)", System Technology Development Research 17-R-6, March 2006, p. 11-12, The Mechanical Social Systems Foundation (contract researcher: Japan Resources Observation System Organization)).

The SAR image is an image based on reflection intensity of an electromagnetic wave (i.e., an image based on scattering intensity), and is affected by the dielectric constant of the photographic subject. Further, due to image distortions caused by foreshortening, layover, radar shadow and the like, and different photographing times, it has been difficult to synthesize the SAR image and the optical image taken by an optical satellite to create a synthetic image (i.e., a pan-sharpened image), and therefore the practical use of the synthetic image of the SAR image and the optical image has not progressed in the past.

It is believed that concrete reasons why the synthetic image of the SAR image and the optical image has not progressed are as follows. As described above, since the SAR image is affected by the characteristics (the dielectric constant and the like) of the material of the photographic subject and the shape of the photographic subject, generally it has the feature that the building area will have high brightness value (i.e., the building area will be bright) due to high reflection intensity of buildings, while the occlusion areas (shadows) will have low brightness value (i.e., the occlusion areas will be dark) due to low reflection intensity of the shadows. Thus, in the urban area, the brightness value of the pixels corresponding to the buildings is often saturated, and therefore the histogram will have a peak in an area having a high brightness value (i.e., a high-brightness area). On the other hand, shadows tend to occur in the forest area or the like, and therefore the histogram will have a peak in an area having a low brightness value (i.e., a low-brightness area). At this time, if the SAR image and the optical image are used to produce a pan-sharpened image (i.e., a synthetic image) while leaving the brightness value (i.e., the histogram characteristics) as it is, the white pixels or the black pixels will be dominant, and therefore the optical image in the synthetic image will be difficult to be seen. In other words, the information contained in the optical image before the optical image is synthesized will be difficult to be interpreted from the synthetic image.

In view of the aforesaid problems, it is an object of the present invention to produce a synthetic image which enables easy interpretation of the terrestrial objects, using a radar image, such as a SAR image, and an optical image.

DISCLOSURE OF THE INVENTION

To solve the aforesaid problems, in the present invention, when radar image data acquired from a radar device equipped in a flying body and optical image data of an area photographed by the radar device are synthesized to produce a terrestrial object information interpreting image, the radar image data are approximated to a black and white panchromatic image character. The radar image data approximated to the black and white panchromatic character and the optical image data are aligned in position and then synthesized.

With such a configuration, radar image data is subjected to a conversion process for approximating the reflection characteristics of the scattering intensity to the reflection characteristics of the black and white panchromatic image, which is familiar to the human eye, and the radar image data subjected to the conversion process is then superimposed on an optical image, thereby it is possible to obtain a synthetic image closer to an image photographed by the optical satellite.

According to the present invention, a synthetic image of a radar image, such as a SAR image, and an optical image is easy to be viewed, and therefore the terrestrial objects are easy to be interpreted.

BRIEF DESCRIPTION OF DRAWINGS

FIGS. 2A and 2B show an example of a histogram of a SAR image and an example of a histogram of an optical image, wherein FIG. 2A shows the histogram of the SAR image, and FIG. 2B shows the histogram of the optical image.

FIGS. 3A and 3B explain an example of histogram smoothing, wherein FIG. 3A shows the histogram characteristics before conversion, and FIG. 3B shows the histogram characteristics after conversion.

BEST MODES FOR CARRYING OUT THE INVENTION

Figure 1:
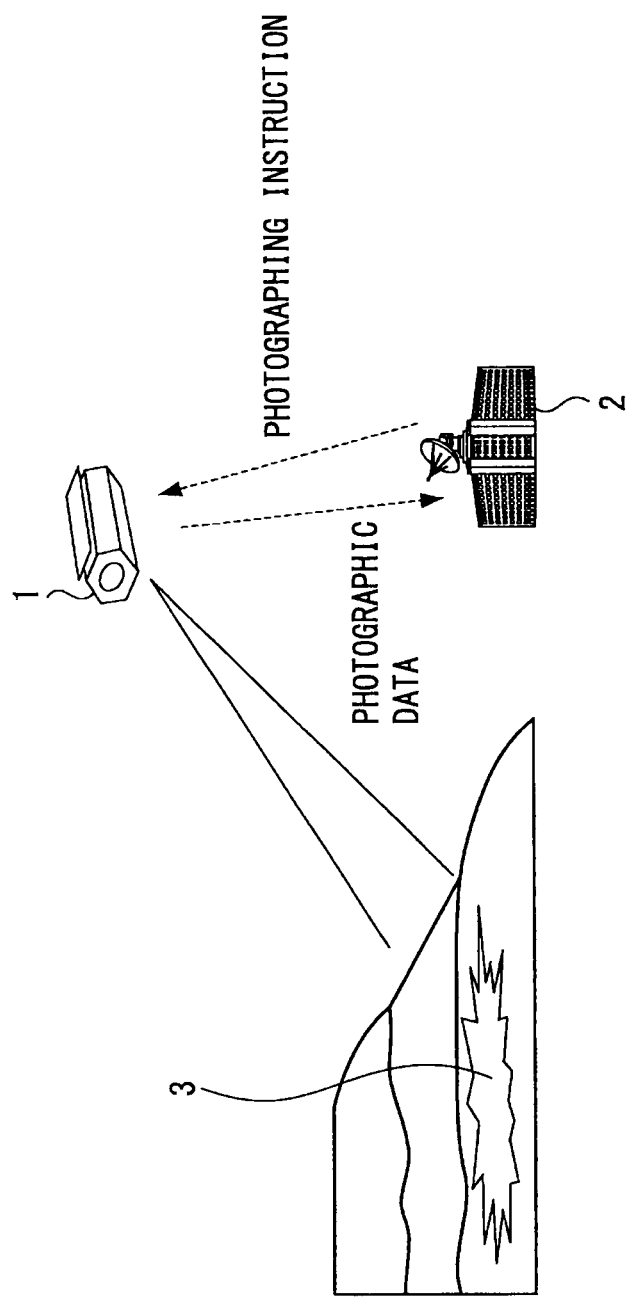
FIG. 1 is a view briefly showing the configuration of a system according to an embodiment of the present invention.

An embodiment according to the present invention will be described below, with reference to the attached drawings.

Since the embodiment described below is a preferred specific example of the invention, various technically preferred limitations are imposed. However, the scope of the invention is not limited to the embodiment unless otherwise specifically stated below. For example, kinds and quantities of employed materials, processing time, processing order, numerical conditions such as parameters and the like, exemplified in the following description, are just preferable examples, and sizes, shapes and layouts in the drawings used for the following description are all schematic.

FIG. 1 briefly shows the configuration of a system according to the aforesaid embodiment of the present invention. In the present system, a Synthetic Aperture Radar (SAR), which is an example of a radar device, is mounted on an artificial satellite, and the Synthetic Aperture Radar photographs the ground surface based on an instruction from a data analysis center 2. The Synthetic Aperture Radar mounted on the artificial satellite is referred to as "satellite SAR" hereinafter.

As shown in FIG. 1, a satellite SAR 1 photographs a ground surface 3, while traveling along a predetermined orbit, periodically or as needed according to the instruction from the data analysis center 2, and transmits photographic data (radar image data) to the data analysis center 2.

The data analysis center 2 creates a photographic plan, and transmits a radio signal, which represents a photographing instruction based on the photographic plan, to the satellite SAR 1. Further, the data analysis center 2 receives data of a radar image photographed by the satellite SAR 1 through an antenna. A reproduction image is produced by performing a synthetic aperture processing on the radar image data with a terrestrial object information interpreting image producing device 10. Further, a synthetic processing is performed for synthesizing the radar image data and optical image data. At this time, the terrestrial object information interpreting image producing device 10 performs a histogram conversion on the radar image data according to the content of the radar image data to approximate the radar image data to a black and white panchromatic image character, and then the radar image data and the optical image data are synthesized. The processing for approximating the radar image data to the black and white panchromatic image character will be described later.

The difference between a SAR image and an optical image will be described below.

Figure 2:
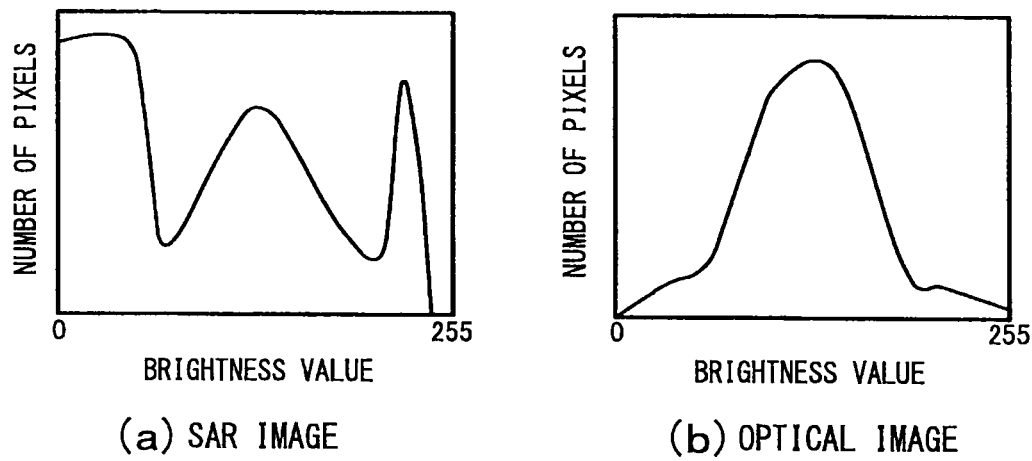

FIGS. 2A and 2B show examples of the histogram of brightness value of an image, wherein FIG. 2A shows an example when the image is a SAR image, and FIG. 2B shows an example when the image is an optical image. In FIGS. 2A and 2B, the abscissa represents the brightness value (8 bits, ranged from 0 to 255) and the ordinate represents the number of pixels of each of the brightness values.

As shown in FIG. 2A, histogram characteristics of the SAR image is generally affected by the material and shape of the photographic subject, shadows become black (refer to the low-brightness area), and metals and edges of buildings become whitish (refer to the high-brightness area) due to strong reflection. In contrast, as shown in FIG. 2B, in histogram characteristics of the optical image, the graph of the number of pixels versus brightness value shows a shape of Poisson distribution. In other words, the optical image has differing brightness even in the shadows (refer to the low-brightness area). Further, in the optical image, since the brightness is not dependent on the material of the photographic subject, no strong reflection occur even on metals and edges of buildings.

Due to different histogram characteristics between the SAR image and the optical image as described above, generally the SAR image is an image having many black pixels and white pixels; while the optical image, not being affected by the material and shape of the photographic subject, has differing brightness across the entire image, and is a natural image which almost perfectly reflects the appearance of the actual photographic subject and in which the photographic subject is easy to be interpreted.

If the aforesaid SAR image, in which black pixels and white pixels are dominant, and the optical image are synthesized to produce a pan-sharpened image (i.e., a synthetic image), black pixels and white pixels will be dominant in the synthetic image, and therefore the optical image in the synthetic image will be difficult to be seen.

Conventionally, a filtering process is performed in order to create a more natural photographic image, however, such a process will smooth and eliminate the original image information of the SAR image, in which terrestrial objects are already hard to be interpreted. Thus, such a filtering process does not practically serve the purpose of facilitating interpreting and viewing terrestrial objects. In contrast, in the present invention, a filtering process (i.e., a histogram conversion process) is performed on the SAR image in order to synthesize the SAR image and the optical image to produce a pan-sharpened image which enables easy interpretation and view of terrestrial objects.

The histogram conversion is a process of obtaining the frequency of occurrence of each of the brightness levels (i.e., the number of pixels) in an image (wherein the frequency of occurrence of each of the brightness levels is called "histogram", or "brightness histogram"), and performing contrast conversion on the obtained frequency of occurrence of each of the brightness levels. The histogram conversion is also called "image enhancement process". The histogram conversion generally means a process for matching a histogram-to-be-converted with a histogram having a predetermined distribution (called a "target histogram"). Typical histogram conversions include histogram smoothing and histogram normalization.

The histogram smoothing (equalization) is a histogram conversion in which the distribution of a target histogram is equalized. In other words, the histogram smoothing is a conversion for converting a histogram so that the slope of the graph of a cumulated frequency (a value obtained by cumulating the number of pixels starting from brightness value 0) of the histogram becomes a constant. By performing such a conversion, it is possible to improve the overall balance of the image that has bad contrast and/or biased brightness. As an example of the histogram conversion, the histogram smoothing will be described below with reference to FIGS. 3A and 3B.

Figure 3:
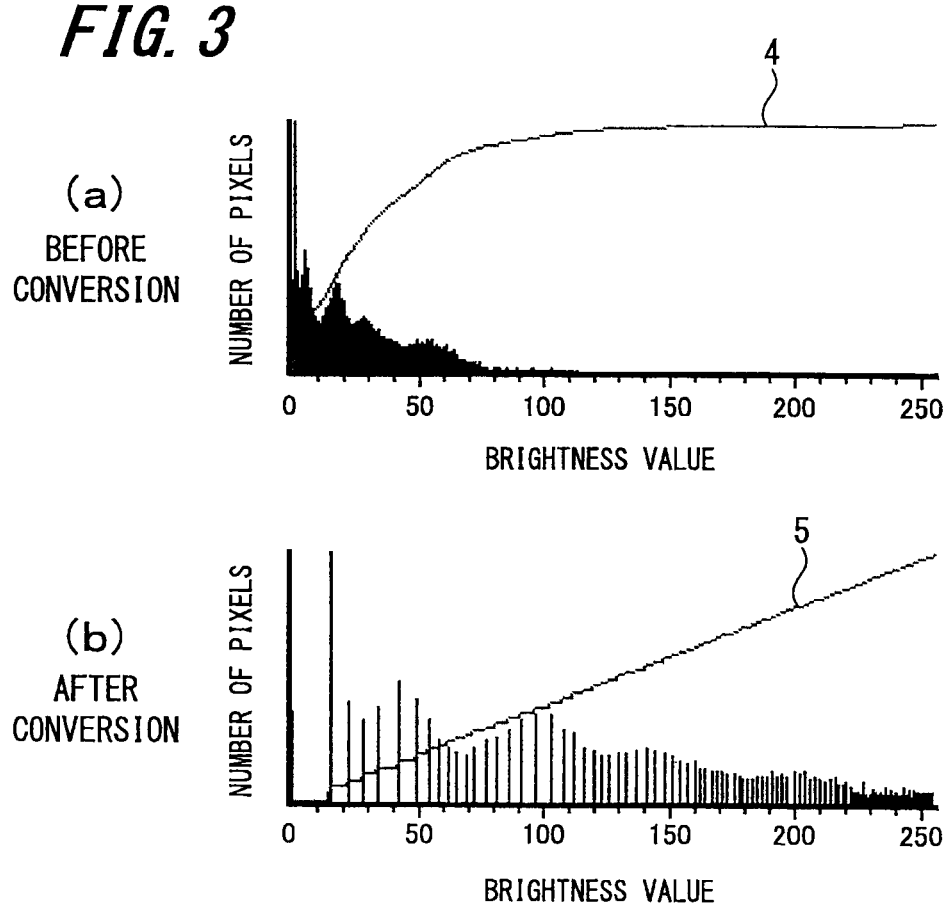

FIGS. 3A and 3B show an example of performing histogram smoothing on an image, wherein FIG. 3A shows the histogram characteristics before conversion, and FIG. 3B shows the histogram characteristics after conversion. As can be known from graph 4 of the cumulated frequency shown in FIG. 3A, almost all pixels are included in a range of up to brightness value 100. However, by performing histogram smoothing, the slope of graph 5 of the cumulated frequency of the number of pixels from brightness value 0 to brightness value 255 becomes constant. Thus, an image, which is a dark image in which the number of pixels in the low-brightness area is great (see FIG. 3A) before performing histogram smoothing, can be converted, by performing histogram smoothing, into an image having balanced brightness (i.e., brightness value) across the image (see FIG. 3B).

Further, the histogram normalization is a histogram variable for making the distribution of a target histogram become a normal distribution (Gaussian distribution), and is a process for assigning the distribution of the target histogram to the normal distribution using the mean value and standard deviation of the brightness values of the image before conversion. By normalizing the histogram distribution of an image, when the image is viewed by a person, histogram characteristics identical to those of the optical image (Poisson distribution) shown in FIG. 2B is visually felt by the person, and therefore the image appears to be a natural image in which interpretation of terrestrial objects is relatively easy.

Typical histogram conversions further include linear conversion, nonlinear conversion and the like. The linear conversion is a process in which the relation between the brightness value of a pixel before the conversion and the brightness value of the pixel after the conversion is a straight line (linear) relation. The nonlinear conversion is a process in which the relational expression between the brightness value of a pixel before the conversion and the brightness value of the pixel after the conversion includes quadratic expression(s) and/or root sign(s) (i.e., the relational expression is nonlinear). Typical nonlinear conversions include a gamma correction used for correcting a video image signal which is reproduced by a TV receiver. The aforesaid histogram normalization is an example of the nonlinear conversions.

The terrestrial object information interpreting image producing device 10 performs the aforesaid histogram conversion on the SAR image according to the content of the SAR image so that the histogram characteristics of the SAR image is approximated to the black and white panchromatic image character (i.e., the histogram characteristics of the optical image), and then the SAR image and a corresponding optical image are synthesized. The synthetic image is used as a terrestrial object information interpreting image.

A sequence of the processes performed by the terrestrial object information interpreting image producing device 10 may be executed either by hardware, or by software. In the case where the sequence of the processes is executed by software, a program constituting the software is installed from a program recording medium, into a computer built in a dedicated hardware, or a general-purpose computer, for example, capable of executing various functions by installing various programs thereon.

Figure 4:
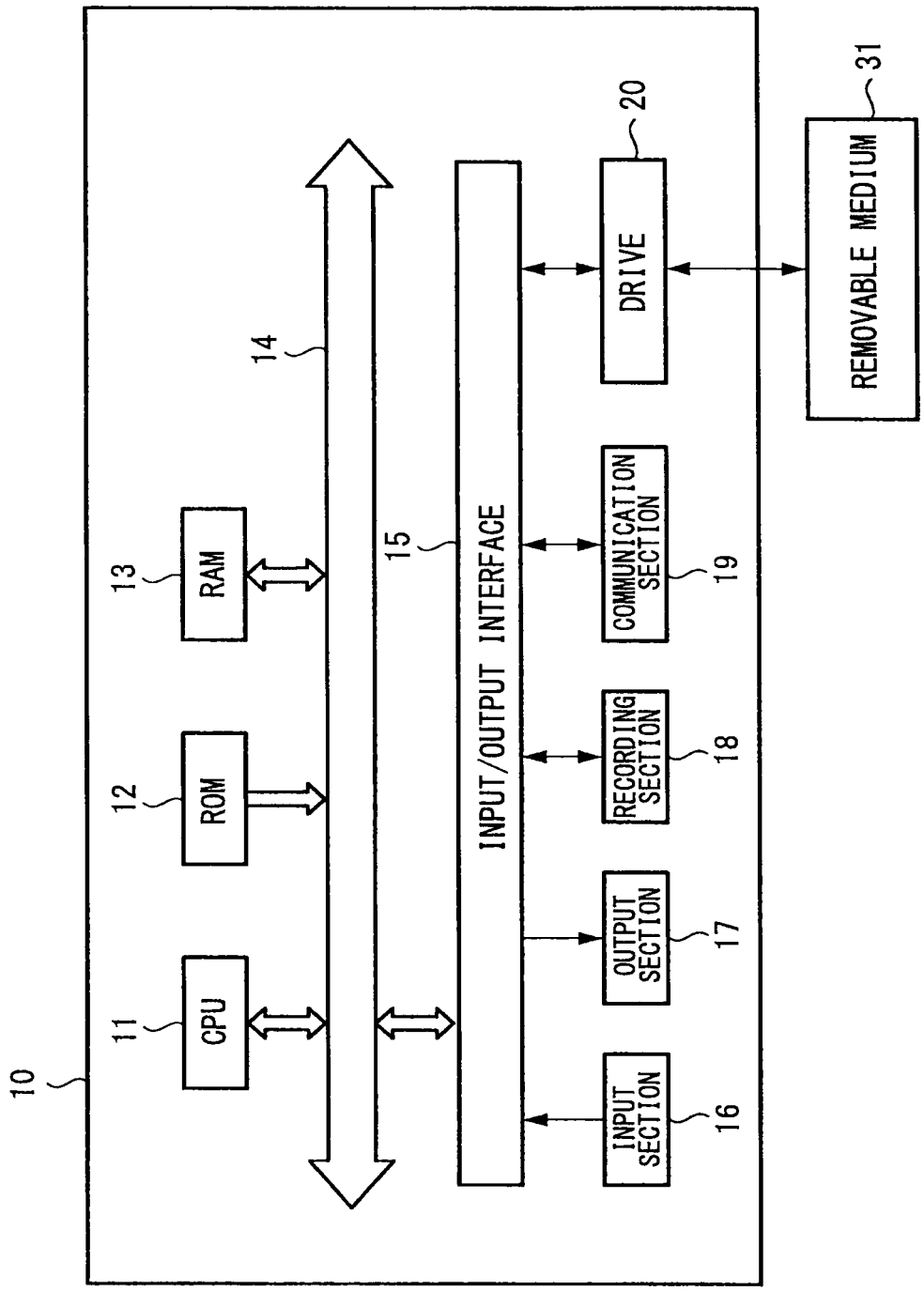
FIG. 4 is a block diagram showing an example of an internal configuration of a computer according to an embodiment of the present invention.

FIG. 4 is a block diagram showing an exemplary configuration of the terrestrial object information interpreting image producing device 10 that performs the aforesaid sequence of the processes by program. The terrestrial object information interpreting image producing device 10 may be, for example, a high-performance dedicated computer for executing a sequence of processes, a personal computer with predetermined performance, or the like.

A CPU (Central Processing Unit) 11 of the terrestrial object information interpreting image producing device 10 executes the aforesaid sequence of the processes and various other processes according to the program recorded in a ROM (Read Only Memory) 12 or a recording section 18. The program executed by the CPU 11, the data and the like are suitably stored in a RAM (Random Access Memory) 13. The CPU 11, the ROM 12 and the RAM 13 are connected with each other through a bus 14.

An input/output interface 15 is connected to the CPU 11 through the bus 14. An input section 16 and an output section 17 are connected to the input/output interface 15, wherein the input section 16 is configured by a keyboard, a mouse, a microphone and/or the like, and the output section 17 is configured by a display, a speaker and/or the like. The CPU 11 executes various processes according to instructions inputted from the input section 16. Further, the CPU 11 outputs the processing result to the output section 17.

The recording section 18 connected to the input/output interface 15 is configured by, for example, a hard disk, and is adapted to record the program executed by the CPU 11 and various data.

A communication section 19 is adapted to communicate with external device(s) through a network such as the Internet, a local area network and the like. The program may also be obtained through the communication section 19 and recorded in the recording section 18.

When a removable medium 31 is mounted on a drive 20 connected to the input/output interface 15, the drive 20 drives the removable medium 31 to obtain a program, data and the like recorded in the removable medium 31, wherein the removable medium 31 may be a magnetic disk (including a flexible disk), an optical disk (including a CD-ROM (Compact Disc Read Only Memory), a DVD (Digital Versatile Disc), and a magnetic optical disk), a semiconductor memory or the like. The obtained program and the data are transferred to and recorded in the recording section 18 according to necessity.

As shown in FIG. 4, the program recording medium for storing the program installed into a computer in a computer-executable manner is configured by the removable medium 31, the ROM 12 where the program is temporarily or permanently stored, a hard disk constituting the recording section 18 or the like, wherein the removable medium 31 is a package medium such as a magnetic disk, an optical disk, a semiconductor memory and the like. The program is stored in the program recording medium through the communication section 19 (which is an interface such as a router, a modem and the like) according to necessity, via a wired or wireless communication medium such as a local area network, the Internet, digital satellite broadcasting and the like.

Figure 5:
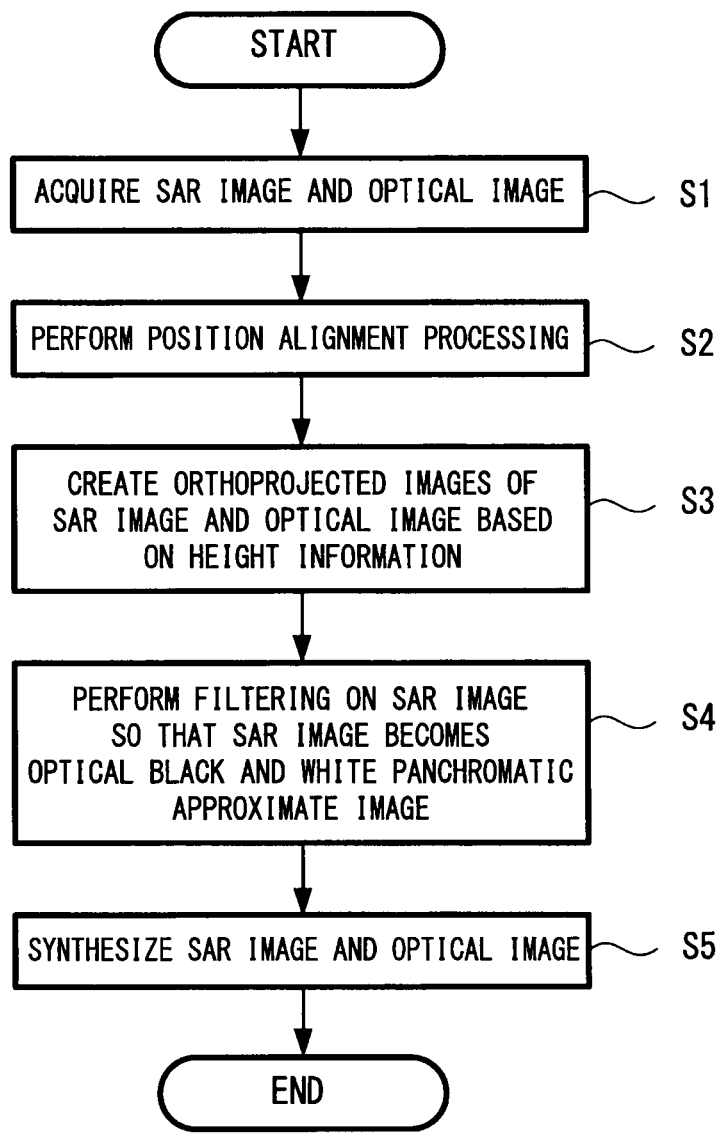
FIG. 5 is a flowchart illustrating an example of a process for producing a terrestrial object information interpreting image according to an embodiment of the present invention.

An example of producing a terrestrial object information interpreting image by the CPU 11 of the terrestrial object information interpreting image producing device 10 will be described below with reference to the flowchart of FIG. 5.

First, the terrestrial object information interpreting image producing device 10 acquires photographic data (a SAR image) of a photographic subject area photographed by the satellite SAR 1. Such a process can be accomplished either by receiving a radio signal containing the photographic data from the satellite SAR 1, or by obtaining the photographic data from the removable medium 31 in which the photographic data is stored (Step S1). Further, an optical image of the photographic subject area is acquired and recorded in the recording section 18 or the removable medium 31. Incidentally, in the case where the photographic range of the SAR image and the photographic range of the optical image do not agree with each other (such as in the case where the optical image is photographed in a wide range at a reduced resolution), the SAR image and the optical image should be synthesized in the common range.

Next, geometry information of the photographic data, i.e., the SAR image, and the optical image is corrected at the same GCPs (Ground Control Points), and a position alignment is performed (Step S2).

Next, an orthoprojected image of the SAR image and an orthoprojected image of the optical image are created based on height information of the ground surface and the structures, such as a DEM (Digital Elevation Model) or the like, obtained by either performing radargrammetry processing or interferometry processing using a plurality of (e.g., two) SAR images, or from the Geographical Survey Institute or the like (Step S3). Such a process is called ortho-correction (or orthorectification), and the created image is called orthoimage. Incidentally, by creating the DEM using the SAR images, distortion of the SAR images can be precisely corrected.

The original SAR image (from which the orthoimage is to be created) is subjected to a filtering process so as to become an optical black and white panchromatic approximate image (Step S4). In other words, the histogram characteristics of the SAR image is approximated to the histogram characteristics of the black and white panchromatic image. With respect to the histogram conversion, it is preferred that an optimum method is selected from the various histogram conversion methods according to the photographic subject. The selection of the histogram conversion method may be accomplished by either of the following two ways. In a first way, the computer automatically interprets the photographic subject from the SAR image and performs the selection based on the interpreting result; and in a second way, since the photographic subject is previously known, an operator ties the SAR image and the photographic subject to each other and registers them in the recording section 18, and the computer performs the selection based on the registered SAR image and photographic subject.

For example, if it can be interpreted that the photographic subject is an urban area based on the optical image (or visual confirmation), the histogram characteristics of the SAR image, and the photographic range obtained from the photographic condition of the satellite SAR, then the conversion may be performed on the high-brightness area only; while if it can be interpreted that the photographic subject is in a so-called forest area, then the conversion may be performed on the low-brightness area only. Further, if the photographic subject area is an area where the urban area(s) and the forest area(s) are mixed, then the photographic subject area may be divided into a plurality of subareas based on the optical image and/or histogram characteristics, and the optimum histogram conversion processing may be performed on each of the subareas.

Thus, the optimum histogram conversion can be performed according to the photographic subject, and thereby the SAR image after the histogram conversion can be approximated more closely to the black and white panchromatic image, so that the synthetic image becomes a natural image which enables easier interpretation of terrestrial objects. Incidentally, the filtering process for turning the SAR image to the optical black and white panchromatic approximate image in Step S4 may also be performed after the orthoimage has been created.

After the process of Step S4 is completed, the SAR image and the optical image are synthesized (Step S5). Further, the produced synthetic image is recorded in the recording section 18 or removable medium 31. At this time, the optical image may also be a true-color image, a false-color image or the like.

By performing a sequence of the aforesaid processes, a synthetic image can be obtained which is a panchromatic approximate image of the SAR image (texture information) with color (color information) added thereto.

Figure 6:
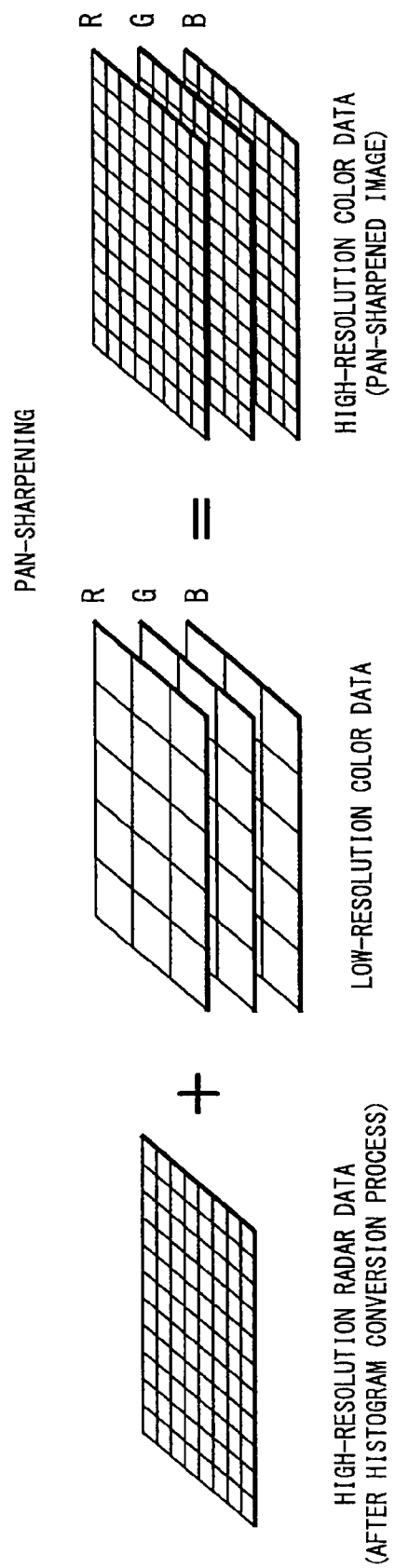
FIG. 6 is a view explaining the concept of pan-sharpening.

FIG. 6 is a view explaining the concept of pan-sharpening. High-resolution color data (i.e., a pan-sharpened image) can be obtained by synthesizing high-resolution monochrome radar data (i.e., a SAR image) having been approximated to the black and white panchromatic image character (i.e., having been subjected to the histogram conversion process) and low-resolution color data (i.e., a RGB optical image) while being aligned in position.

As a result, the terrestrial object (for example, a tree in farmland), which would be impossible to be interpreted in a low-resolution optical image, can be interpreted by referring to the high-resolution SAR image components contained in the synthetic image. Further, the area (for example, a radar shadow of a tree in farmland), which would not be linked to the terrestrial object in a high-resolution SAR image, can be interpreted by referring to the low-resolution optical image components contained in the synthetic image. Further, in the case high-resolution monochrome radar data (i.e., a SAR image) of an urban area, for example, the black pixels or white pixels are dominant and the low-resolution color data (i.e., the optical image) will be damaged when creating the pan-sharpened image, and therefore the terrestrial objects will be difficult to be interpreted. However, such a problem can be solved by performing the histogram conversion process.

As described above, according to the present embodiment, it is possible to obtain an image which enables easy interpretation of terrestrial objects by producing an image which contains both texture information (for interpreting the shapes) acquired from a high-resolution SAR image and color information of the terrestrial objects (for interpreting the condition and environment) acquired from a low-resolution optical image.

Further, the conversion process for approximating the reflection characteristics of the scattering intensity to the reflection characteristics of the black and white panchromatic image, which is familiar to the human eye, is performed to the SAR image, and then the SAR image is superimposed on the optical image, therefore it is possible to obtain a high resolution image that is close to an image taken by an optical satellite.

Further, as an operating form, the high-resolution SAR image and the low-resolution optical image are used. Because the SAR image can be reliably taken without being affected by weather conditions and the like, the high-resolution texture image can be easily acquired, and therefore shapes, types and the like of the terrestrial objects can be interpreted. On the other hand, since the optical image is susceptible to weather conditions, the optical image is taken at low-resolution to cover a wide range and colored and used as complementary information for grasping conditions of the photographic range.

Incidentally, in the above description, the process steps describing the program stored in the program recording medium may or may not be sequentially performed in the same time series order as described above. Alternatively, the process steps may be performed in parallel or separately.

Further, the program may be executed by a single computer or executed by a plurality of computers in a distributed manner. Furthermore, the program may be transferred to a remote computer so as to be executed in that computer.

EXPLANATION OF REFERENCE NUMERALS 1 satellite SAR,
2 data analysis center,
3 ground surface (photographic subject),
4, 5 cumulated number of pixels,
10 terrestrial object information interpreting image producing device,
11 CPU,
12 ROM,
13 RAM, 14 bus,
15 input/output interface,
16 input section,
17 output section,
18 recording section,
19 communication section,
20 drive,
31 removable medium

The invention claimed is:

1. A terrestrial object information interpreting image producing method for synthesizing radar image data of an area acquired from a radar device mounted on a flying body and optical image data of the area to produce a terrestrial object information interpreting image, the method comprising the steps of:
   approximating the radar image data to a black and white gray-scale image;
   performing an alignment between the radar image data and the optical image data; and
   synthesizing the radar image data having been approximated to the black and white gray-scale image and the optical image data.

2. The terrestrial object information interpreting image producing method according to claim 1, wherein, in the approximating the radar image data to the black and white gray-scale image, a histogram conversion is performed according to histogram characteristics of the radar image data.

3. The terrestrial object information interpreting image producing method according to claim 2, wherein if a high-brightness area is dominant in the histogram characteristics of the radar image data, the histogram conversion is performed mainly on the high-brightness area of the radar image data.

4. The terrestrial object information interpreting image producing method according to claim 3, wherein both the radar image data and the optical image data used in the synthesizing are orthoprojected images.

5. The terrestrial object information interpreting image producing method according to claim 3, wherein the radar device is a Synthetic Aperture Radar.

6. The terrestrial object information interpreting image producing method according to claim 2, wherein if a low-brightness area is dominant in the histogram characteristics of the radar image data, the histogram conversion is performed mainly on the low-brightness area of the radar image data.

7. The terrestrial object information interpreting image producing method according to claim 6, wherein both the radar image data and the optical image data used in the synthesizing are orthoprojected images.

8. The terrestrial object information interpreting image producing method according to claim 6, wherein the radar device is a Synthetic Aperture Radar.

9. The terrestrial object information interpreting image producing method according to claim 2, wherein if a first area where a high-brightness area is dominant and a second area where a low-brightness area is dominant are mixed in the radar image data, the first area and the second area are separated from each other, and optimum histogram conversions are performed on the first area and the second area respectively.

10. The terrestrial object information interpreting image producing method according to claim 9, wherein both the radar image data and the optical image data used in the synthesizing are orthoprojected images.

11. The terrestrial object information interpreting image producing method according to claim 9, wherein the radar device is a Synthetic Aperture Radar.

12. The terrestrial object information interpreting image producing method according to claim 2, wherein both the radar image data and the optical image data used in the synthesizing are orthoprojected images.

13. The terrestrial object information interpreting image producing method according to claim 2, wherein the radar device is a Synthetic Aperture Radar.

14. The terrestrial object information interpreting image producing method according to claim 1, wherein both the radar image data and the optical image data used in the synthesizing are orthoprojected images.

15. The terrestrial object information interpreting image producing method according to claim 1, wherein the radar device is a Synthetic Aperture Radar.

16. A non-transitory computer readable medium storing computer-readable instructions thereon, the computer-readable instructions, when executed by a computer, cause the computer to perform a method for synthesizing radar image data of an area acquired from a radar device mounted on a flying body and optical image data of the area to produce a terrestrial object information interpreting image, the method comprising:
   approximating the radar image data to a black and white gray-scale image;
   performing a position alignment between the radar image data and the optical image data; and
   synthesizing the radar image data having been approximated to the black and white gray-scale image and the optical image data.

* * * * *